US005439730A

United States Patent [19]

Kelly et al.

[11] Patent Number: 5,439,730

[45] Date of Patent: Aug. 8, 1995

[54] FLOWABLE LOOSE PACKING DUNNAGE

[75] Inventors: Peter C. Kelly, Neenah; Daniel L. Hoefler, Kaukauna; Russell L. Johnson, Weyauwega; Barry S. Hammerberg, Appleton; R. Bradley Stillahn, Oshkosh, all of Wis.; Katherine L. Kalz, Watervliet, Mich.

[73] Assignee: Productive Solutions, Inc., Neenah, Wis.

[21] Appl. No.: 943,944

[22] Filed: Sep. 11, 1992

[51] Int. Cl.[6] .......................... B32B 3/00; B65D 81/02

[52] U.S. Cl. .................................... 428/156; 428/153; 428/154; 428/167; 428/172; 428/182; 428/184; 428/371; 206/584; 206/814; 493/967

[58] Field of Search ............... 428/156, 172, 182, 184, 428/167, 141, 153, 154, 192, 371, 397, 400, 537.5; 493/967; 206/584, 814

[56] References Cited

U.S. PATENT DOCUMENTS 1,042,928 10/1912 Kopf .
1,600,438 9/1926 Tiffany .
1,731,967 10/1929 Antonsen .
2,237,086 4/1941 Bruns .................................. 266/26.5
2,563,132 8/1951 Paige ..................................... 229/42
2,621,567 12/1952 Lee ........................................... 93/1
2,714,570 8/1955 Brown .................................. 154/55
2,924,154 2/1960 Russell et al. ............................ 93/1
3,037,653 6/1962 Morisette ............................. 215/81
3,074,543 1/1963 Stanley ................................. 206/46
3,088,647 5/1963 Zastrow ............................... 229/14
3,650,877 3/1972 Johnson ............................... 161/47
4,247,289 1/1981 McCabe .............................. 493/386
4,494,897 1/1985 Rogers ............................... 410/154
4,500,586 2/1985 Bussey, Jr. .......................... 428/174
4,585,381 4/1986 Boyse ................................ 410/154
4,997,091 3/1991 McCrea .............................. 206/584
5,173,352 12/1992 Parker ............................... 428/174
5,213,867 5/1993 Huston et al. ....................... 428/126

OTHER PUBLICATIONS

Undated Eco-Pack ad for kraft paper packing material.
Undated American Excelsior ad for starch-based loose fill.
1991 Evergreen solution ad for biodegradable loose fill packaging.
Undated American Excelsior ad for aspen fiber packing material.
Undated Free-Flow Packaging ad for renewable crop loose fill packaging material.
Undated Bio-Fill ad for grain packing material.
May 1990 Dow Chemical ad for plastic loose fill material.
Undated Dow Chemical ad for photodegradable loose fill.
Undated Dow Chemical ad for plastic loose fill.
Undated Free-Flow Packaging ad for recycled polystyrene loose fill packing material.

*Primary Examiner*—Donald J. Loney
*Attorney, Agent, or Firm*—Quarles & Brady

[57] ABSTRACT

Flowable loose packing dunnage is formed from paperboard into three dimensional particles of various shapes. Also, an apparatus for forming the dunnage employs two vertically aligned arrays of toothed, untoothed and/or cutting wheels through the nip of which paperboard segments pass and by which they are shaped into dunnage particles. Further, in a method of forming the dunnage particles, strips of paperboard are cut into segments which are formed into three dimensional shapes. A method of protecting a packed object surrounds it with the flowable loose packing dunnage made of paperboard in accordance with the present invention.

27 Claims, 7 Drawing Sheets

FIG. 1
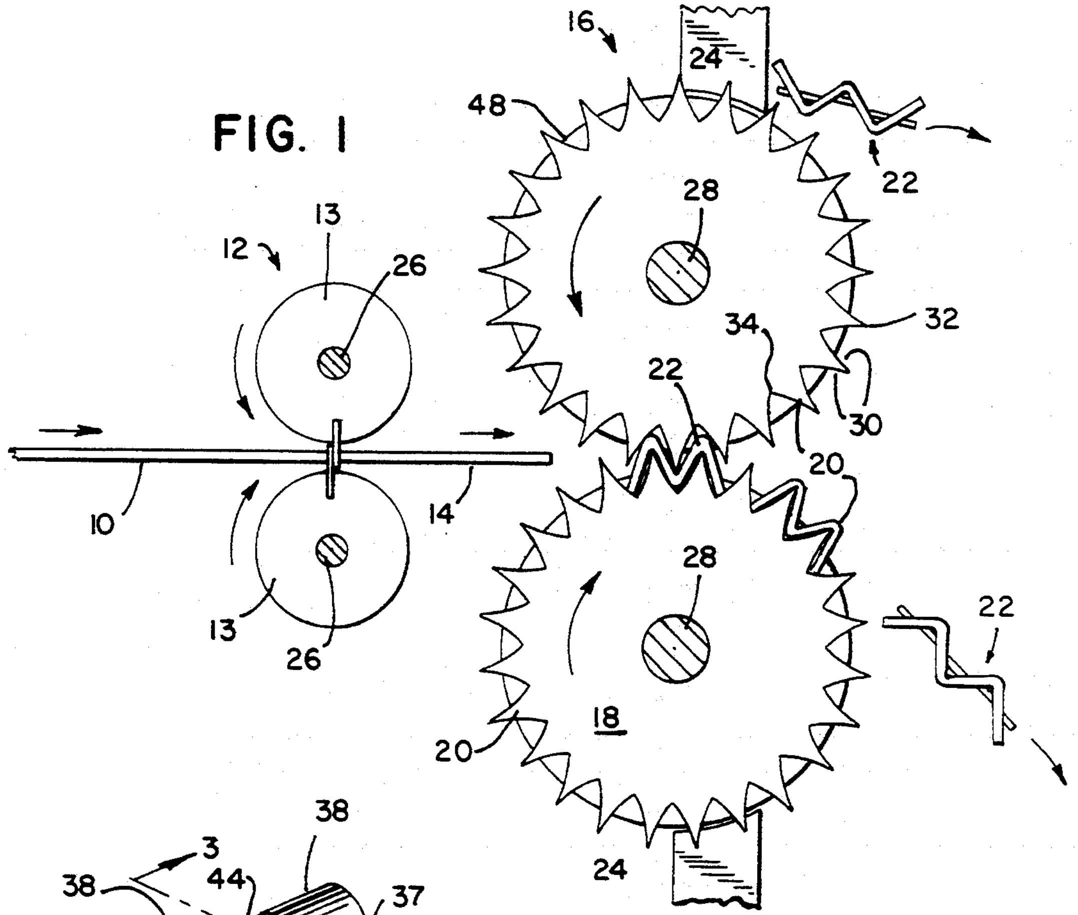
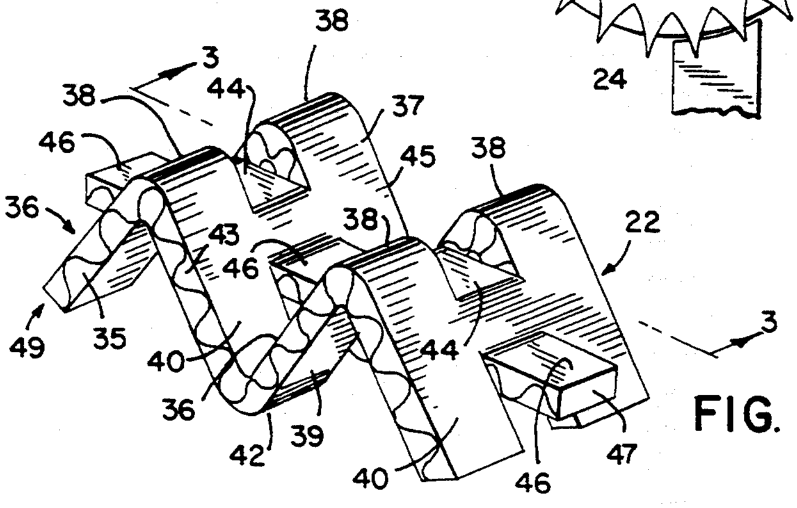
FIG. 2
FIG. 3
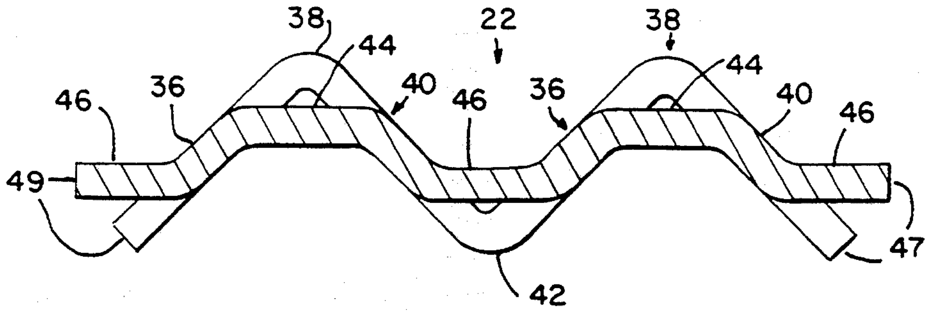

FIG. 4
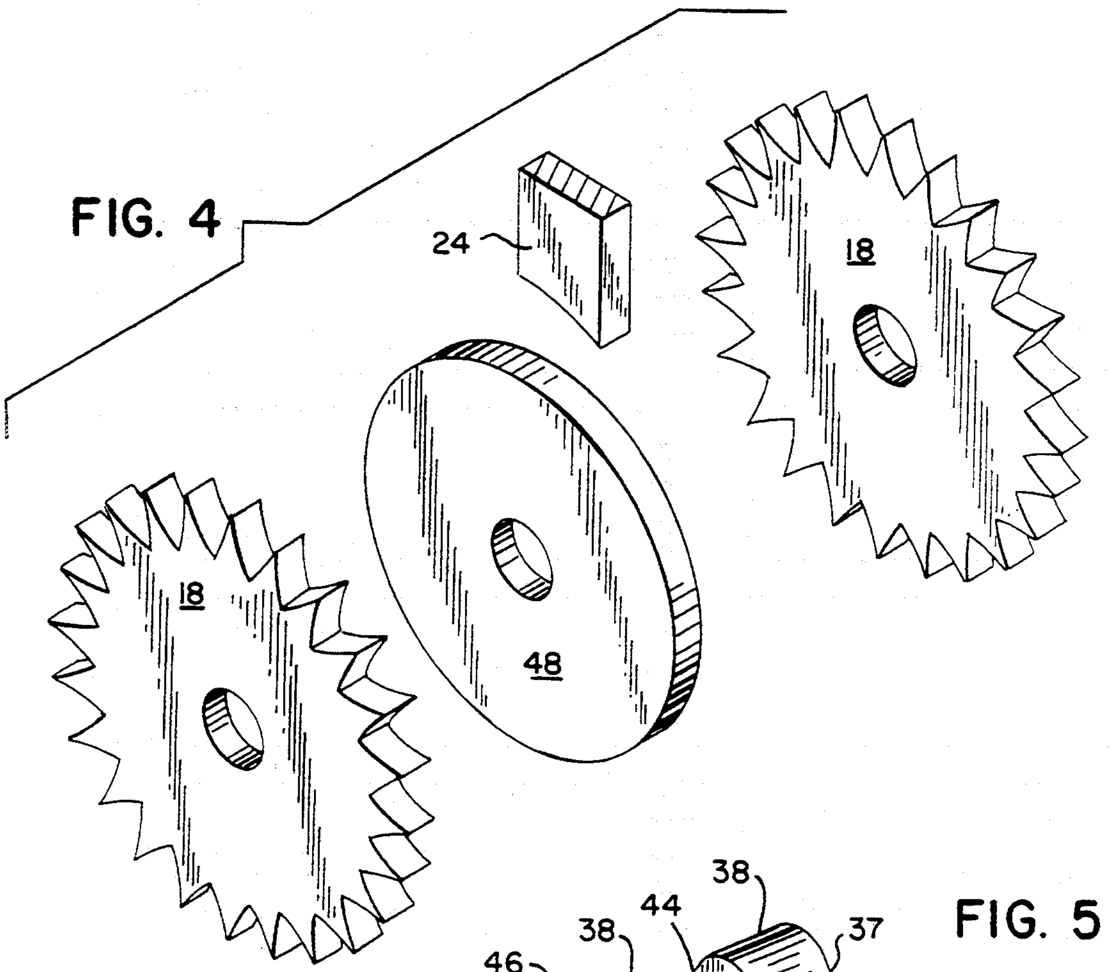
FIG. 5
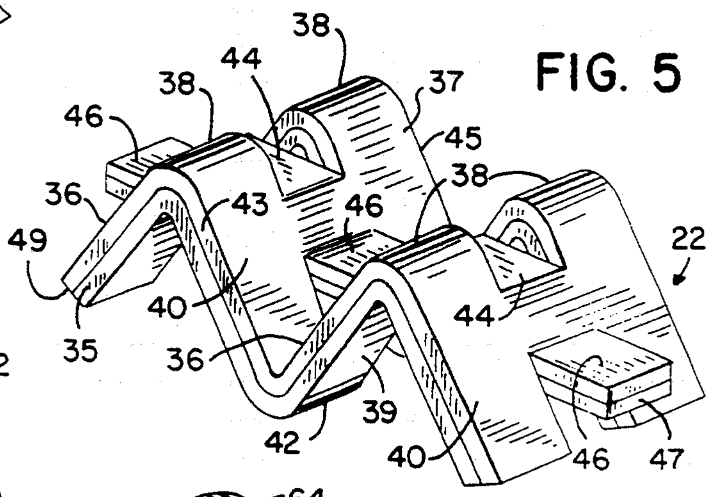
FIG. 16
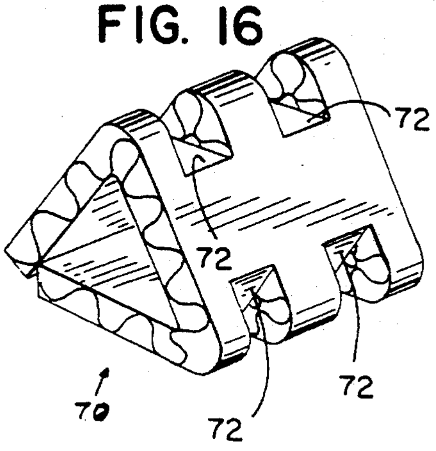
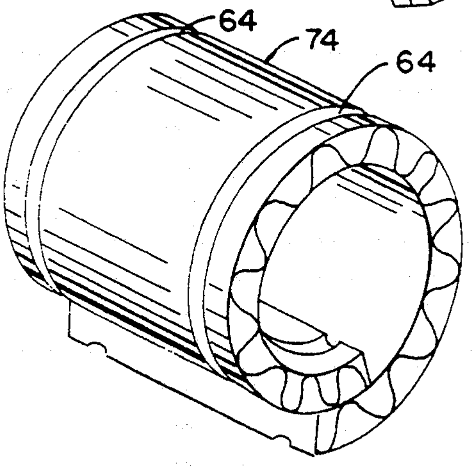
FIG. 17

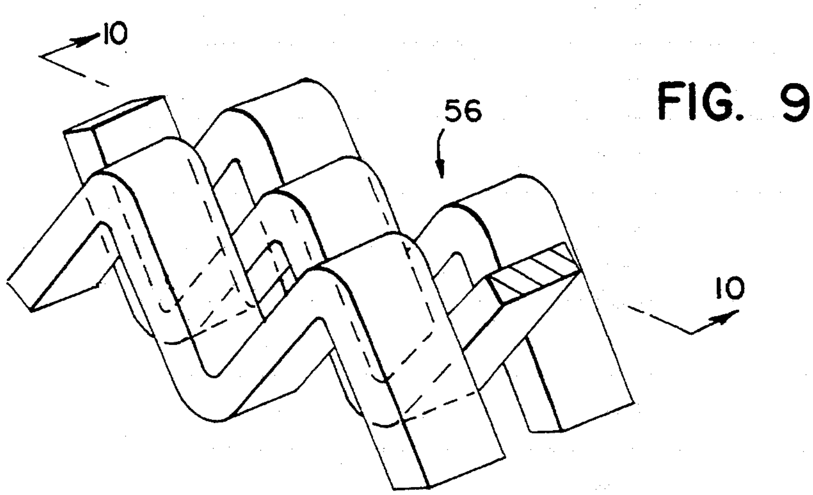
FIG. 9
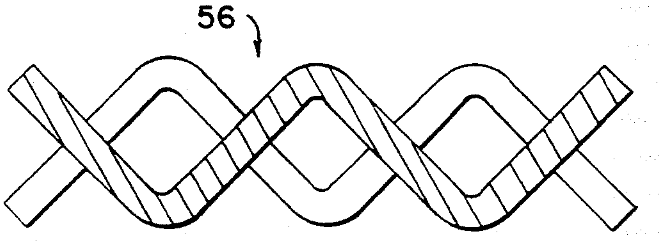
FIG. 10
FIG. 18
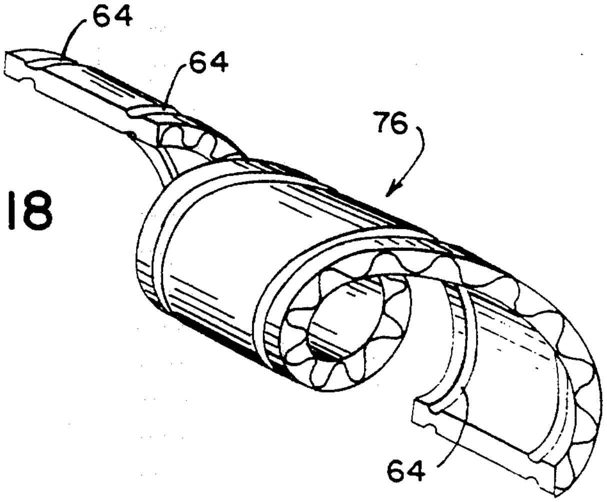
FIG. 19
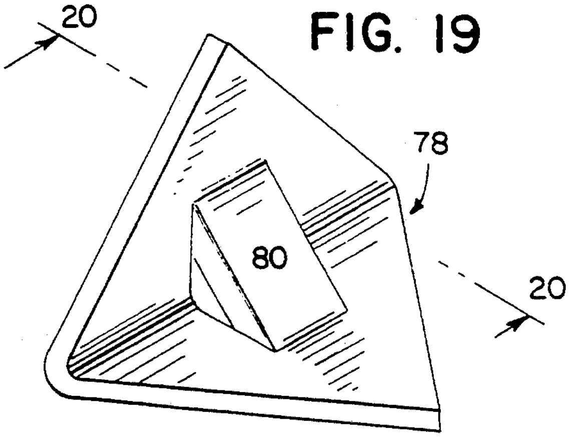
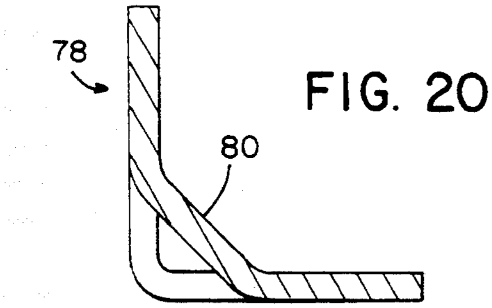
FIG. 20

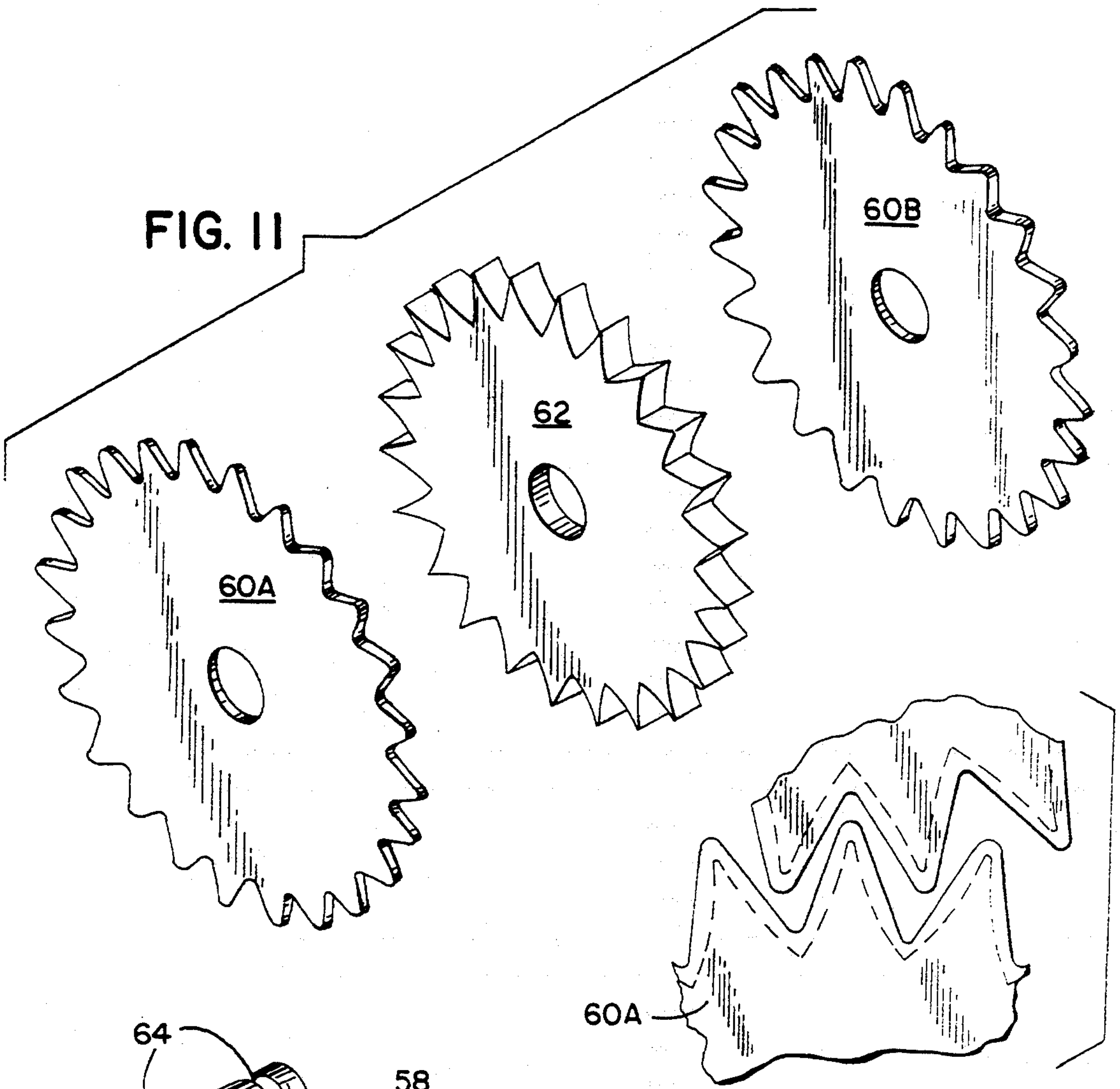
FIG. 11
FIG. 12
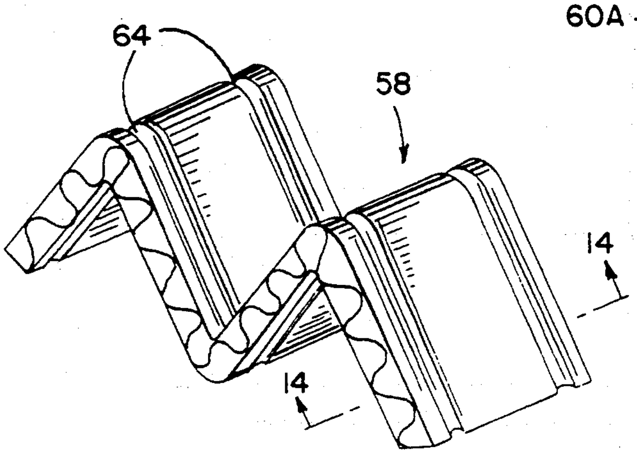
FIG. 13
FIG. 14
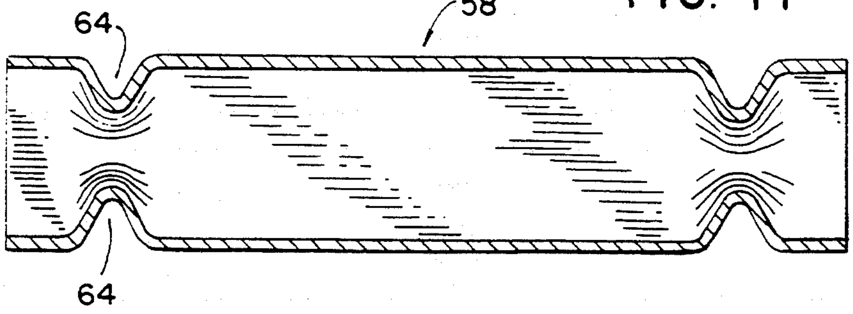

FLOWABLE LOOSE PACKING DUNNAGE

BACKGROUND OF THE INVENTION

1. Field of the Invention

This invention relates to the field of flowable loose packing particles used to surround and thereby cushion and protect a packed object.

2. Description of the Art

The present invention addresses the needs for (1) an environmentally degradable, inexpensive and effective loose packing product and (2) a productive use for scrap and used paperboard.

Internal packing which cushions and protects packaged articles may be categorized as "formed" and "loose" packing (also known as "dunnage"). Formed packing usually consists of relatively large pieces of a stiff material, such as styrofoam, which have been shaped to fit a specific article and a specific container. In contrast, loose packing consists of non-specifically shaped materials which overall conform to the shapes of the particular article and container and thereby largely fill the spaces between the article and the container side walls. Loose packing includes crumpled sheets, ribbons and flowable particles. Crumpled sheet packing may be made by crumpling sheets of newspaper, craft paper, plastic films in which air bubbles have been formed or other flexible sheet materials. Packing ribbons may be made from shredded paper, excelsior, straw or paper sheets and the like which are intertwined and twisted or otherwise formed into ribbons or rolls. Such ribbons are often used to fill relatively small and irregularly shaped packing volumes.

The present invention falls within the flowable particle subset of loose packing materials. Flowable particles are objects which are of a shape and sufficiently small size that they readily flow into the voids around and between the packed articles which they are intended to protect. The longest dimension of a flowable particle is commonly in the range of about ½ inch to 3 inches. The most widely used flowable particles are those made of expanded polystyrene and commonly referred to as "peanuts". See U.S. Pat. No. 4,500,586 issued to Bussey. The plastic "peanut" is not readily biodegradable and has familiar handling difficulties caused by static electricity. Other flowable particles have been made from popped popcorn, waste drinking straw stock (U.S. Pat. No. 3,074,543 issued to Stanley), and segments cut from loose packing ribbons (U.S. Pat. No. 3,650,877 issued to Johnson).

In addition to the desirability of providing another and improved flowable packing material, there is a need to recycle scrap and used paperboard. For purposes of this application, "paperboard" includes "stiff" paper and fabricated paperboard. Stiff paper is paper which is heavier, thicker and more rigid than the paper usually used for printing, writing, wrapping and sanitary purposes. In general, sheets more than 0.012 inches thick are stiff paper and hence paperboard herein; thinner sheets are not stiff paper and not paper board herein. However, there are exceptions—e.g., blotting paper, felts and some drawing paper may be classified as not stiff paper even if thicker than 0.012 inches because they have no substantial stiffness, and paper used for the facings of corrugated paperboard or for the outer plies of solid fabricated paperboard are classified in the industry as paperboard despite being thinner than 0.012 inches. The other type of paperboard, fabricated paperboard, is a structure made of two or more laminated plies of paper; fabricated paperboard may be corrugated or may be made of solid plies. Tagboard and folding carton stock are included within the meaning of "paperboard" as used herein.

Much scrap paperboard is generated in a fabricated paperboard container plant. In assembling fabricated paperboard, a strip ("side trim") is cut off of each side because the adhesive is less effectively applied at the edges or to trim the finished paperboard sheet to a desired size. In addition, scrap is generated from die cutting operations and from damaged and overrun products. Other industries may generate substantial quantities of scrap paperboard as well. In addition to scrap paperboard, the invention may be practiced with used paperboard, including old corrugated containers (OCC). Currently, some of this scrap and used paperboard is shipped to paper mills for reprocessing and is used to make new paperboard. What is needed is a higher-value use for scrap and used paperboard.

The present invention addresses both of these needs by providing a method and an apparatus to make flowable loose packing dunnage from scrap paperboard and a method for using that dunnage to protect packaged articles.

It will be recognized that the invention may be practiced with virgin paperboard, as well as with scrap and used paperboard.

SUMMARY OF THE INVENTION

In one aspect, the invention provides flowable loose packing dunnage comprising multiple particles. Each of the particles is made of paperboard of a certain thickness, length and width. Each particle is given a shape in the third dimension, whereby its effective depth is greater than the thickness of the paperboard. (For purposes of this application, "effective depth" is the interior height of a hypothetical six-sided orthogonal box which is just big enough to hold the article). The structure of the particles of the present invention provides strength and resiliency and enables them to effectively occupy a substantially larger volume of space than the segments from which the particles are formed. This provides an advantage over prior art punch-out and cut-out particles. In particular aspects of the invention, the strength and resiliency of the particle is enhanced by crimping or by tearing and bending part of the paperboard segment into a strut.

In another aspect, the invention provides a method for making flowable loose packing dunnage. According to the method, strips of paperboard of a certain width and thickness are provided. The strips are then cut into segments having a certain length. Following that, the segments are formed so that they have an effective depth greater than the thickness of the strip. In one aspect of the invention, the cut segments are thrown substantially unguided into the forming mechanism. Cutting the paperboard into segments before shaping it, and throwing rather than controllably feeding the cut segments into the forming mechanism, help to minimize jamming and facilitate the handling of pieces of scrap of various sizes and shapes.

In another aspect, the invention provides an apparatus for forming paperboard into flowable loose packing dunnage. The apparatus comprises at least a pair of opposed toothed wheels whose respective teeth mesh as the wheels rotate. The teeth are formed and spaced such that the paperboard moving between them is bent, torn and/or cut into a selected, resilient shape. In one aspect, each particle is formed by two or more adjacent pairs of opposed wheels, which may include a toothed pair, a crimping pair or a cutting pair.

In a final aspect, the invention provides a method for protecting a packed object. The method comprises surrounding the object with flowable loose packing dunnage made in accordance with the present invention.

It is an object of the present invention to provide environmentally sound, easily handled and low cost flowable loose packing dunnage and to do so with a method and apparatus which can be directly incorporated into the paperboard manufacturing process and which will easily handle the large range of sizes and shapes of scrap generated by that process. It is yet another object to recycle and effectively use scrap paperboard without the need to deconstitute it and use it as raw material for making additional paperboard.

These and other objects and advantages of the invention described herein will be apparent from the description which follows. The preferred embodiments will be described with reference to the accompanying drawings. These embodiments do not represent the full scope of the invention. Rather, the invention may be employed in other embodiments. Reference should therefore be made to the claims herein for interpreting the breadth of the invention.

BRIEF DESCRIPTION OF THE DRAWINGS

FIG. 1 is a schematic illustration of an apparatus for making one embodiment of flowable loose packing dunnage of the present invention;

FIG. 2 is a perspective, partially schematic view of a particle produced from corrugated paperboard by the apparatus of FIG. 1;

FIG. 3 is a cross-sectional view taken on line 3—3 of FIG. 2;

FIG. 4 is an exploded, partially schematic view of components of the embodiment of FIG. 1;

FIG. 5 is a perspective, partially schematic view of a particle produced from solid fabricated paperboard by the apparatus of FIG. 1;

FIG. 9 is a perspective, partially schematic view of a particle produced by the apparatus of FIGS. 6 through 8;

FIG. 10 is a cross-sectional view taken on line 10—10 of FIG. 9;

FIG. 11 is an exploded perspective view of the forming wheels of another embodiment which crimps the edges of the particles;

FIG. 12 is an enlarged side elevational view of a portion of FIG. 11 showing the intermeshing of the wheels;

FIG. 13 is a perspective, partially schematic view of the particle produced by the embodiment of FIGS. 11 and 12;

FIG. 14 is a cross-sectional view taken along line 14—14 of FIG. 13;

FIG. 16 is a perspective, partially schematic view of another packing particle of the present invention;

FIG. 17 is a perspective, partially schematic view of a further packing particle of the present invention;

FIG. 18 is a perspective, partially schematic view of another packing particle of the present invention;

FIG. 19 is a perspective, partially schematic view of another packing particle of the present invention;

FIG. 20 is a cross-sectional view taken on line 20—20 of FIG. 19;

Figure 6:
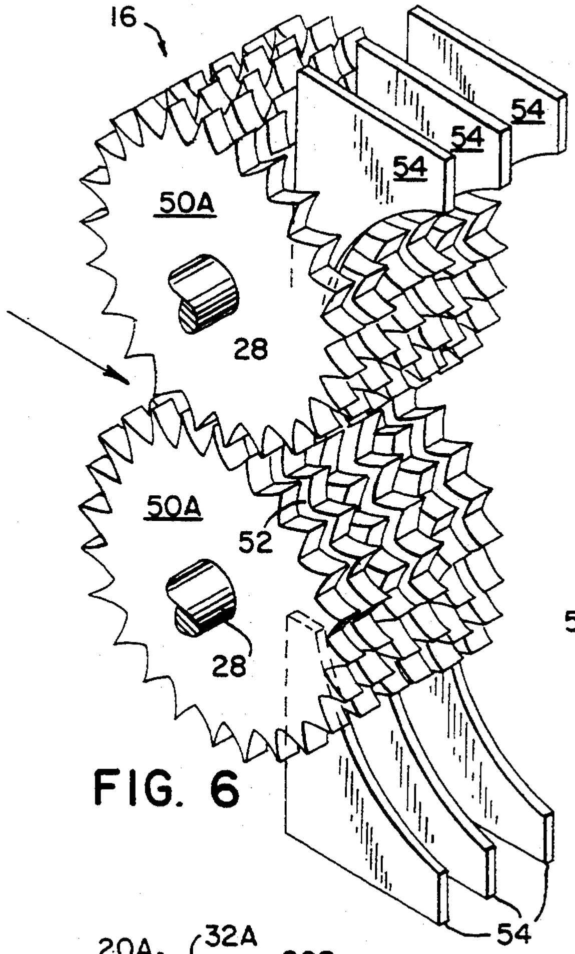
FIG. 6 is a perspective view of another embodiment of an apparatus of the present invention.

The FIGURES showing particles are partially schematic in that the actual particles may be somewhat wrinkled and show evidence of having been torn and bent.

DESCRIPTION OF THE PREFERRED EMBODIMENTS

FIG. 1 schematically shows an apparatus and a method for forming flowable loose packing dunnage particles ("particles"). Scrap paperboard, which may be side trim generated in the process of manufacturing fabricated paperboard, is conveyed into the nip of rotary die cutter 12, which cuts the strip into segments 14 of paperboard. The segments 14 are then fed into forming apparatus 16, which comprises at least a pair of rotating toothed wheels 18 which are aligned vertically so that their teeth 20 mesh. The segments of paperboard are formed and shaped into loose packing dunnage particles 22 as they pass through the meshing teeth 20. The formed particles 22 may initially adhere to one of the wheels 18, but are removed by centrifugal force or by stripper 24 and fall into a container (not shown).

Still referring to FIG. 1, in a preferred embodiment the strip 10 of scrap paperboard is conveyed into the nip of cutter 12 manually, or by means of an air stream, a conveyor belt, rollers (which are not shown) or on-line in a process of making paperboard. The cut segments 14 of paperboard are expelled from the cutter 12 into the meshing teeth of forming apparatus 16. It has been found that jamming is minimized if segments 14 are free of restraint when they enter the forming apparatus 16, as opposed to being fed in a guided and restrained way. In this sense, the segments 14 are "thrown" into forming apparatus 16.

In some applications, the strip 10 of scrap paperboard may be side trim which has been cut from a sheet of fabricated paperboard in the process of manufacturing the fabricated paperboard, as mentioned above. After being slit from the paperboard, the side trim continues directly into the nip of cutter 12. The rotating speeds of cutter 12 and forming apparatus 16 are regulated to be compatible with the speed of the paperboard fabricating machine. In that way, particles can be manufactured on line with a minimum of additional handling. The cutting cylinders 13 of cutter 12 and the toothed wheels 18 of forming apparatus 16 rotate on shafts 26 and 28 respectively. The shafts 26 and 28 may be powered and their speed regulated by conventional means.

Toothed wheels 18 can be formed from any suitable metal such as aluminium or steel. In a preferred embodiment shown in FIG. 1, each of the teeth 20 has the shape of a slender isosceles triangle with slightly concave legs 30. Legs 30 meet at peak 32, and adjacent legs 30 of adjacent teeth 20 meet at valley 34. In establishing the vertical alignment of a pair of opposed tooth wheels 18, the spacing between peak 32 of one of the wheels 18 and valley 34 of the other wheel at the point of maximum meshing is critical, and it depends on the thickness of the paperboard being formed. This space must be small enough to bend the paperboard beyond its elastic limit (i.e. to crimp it), so that it retains a resilient bent shape, but must be large enough to avoid making the bend limp rather than resilient or even severing the paperboard. Forming apparatus 16 may be provided with conventional means (not shown) for conveniently adjusting this space.

FIGS. 2, 3, and 5 show particle 22 made by the apparatus of FIG. 1. FIG. 2 shows particle 22 as made of conventional corrugated paperboard made up of a center fluted layer 35 which is adhered at its peaks to facing layer 37 and adhered at its valleys to facing layer 39. Any conventional fabricated paperboard may be used to practice the invention provided it has substantial stiffness, in comparison to papers such as a newspaper. For example, corrugated paperboard having C-size flutes and a burst strength of 150 pounds per square inch has been found suitable for practicing the invention.

While corrugated paperboard is preferred, the invention may also be produced with solid fabricated paperboard as in the embodiment of FIG. 5. Solid fabricated paperboard is made of two or more plies of paper, stiff paper or paperboard. Stiff, one-ply paper may be used as well.

FIG. 3 shows a schematic cross-sectional view of the particles 22 of FIGS. 2 and 5. Particle 22 has been formed into an undulating shape having rises 36, peaks 38, falls 40 and valley 42. However, in the longitudinal middle portion of particle 22, each peak 38 has been flattened to form a plateau 44 and each valley 42 has been raised to form a bridge 46. Plateaus 44 and bridges 46 act as struts which help maintain the shape and enhance the structural strength and resiliency of particle 22. The particle 22 also has laterally opposed side edges 43 and 45 and longitudinally opposed ends 47 and 49 (defined by the free ends of the side edges 43 and end bridges 46).

FIG. 4 shows in greater detail the array of the wheels of the forming apparatus 16 which may be used to make the particles 22 of FIGS. 2, 3 and 5. The array shown in FIG. 4 is mounted on a shaft 28 (FIG. 1), and a corresponding array is mounted below it on another shaft 28 such that the teeth 20 of the upper and lower wheels 18 mesh. The outboard wheels of each array are toothed wheels 18 and the interior wheel is smooth wheel 48, the outer edge of which can also be seen in FIG. 1. In operation, toothed wheels 18 bend the outboard longitudinal portions of particle 22 into the undulating shape shown in FIGS. 2, 3 and 5. The upper one of the pair of smooth wheels 48 prevents the middle portion of particle 22 from rising to the height of peak 38, and the lower one of the pair of smooth wheels 48 prevents the middle portion of particle 22 from descending to the depth of valley 42. In this way, plateaus 44 and bridges 46 are formed by tearing or shearing those parts of the middle portion of particle 22 from the corresponding outboard portions. It will be recognized, however, that particles 22 may be formed and shaped by other methods and apparatus as well.

Figure 7:
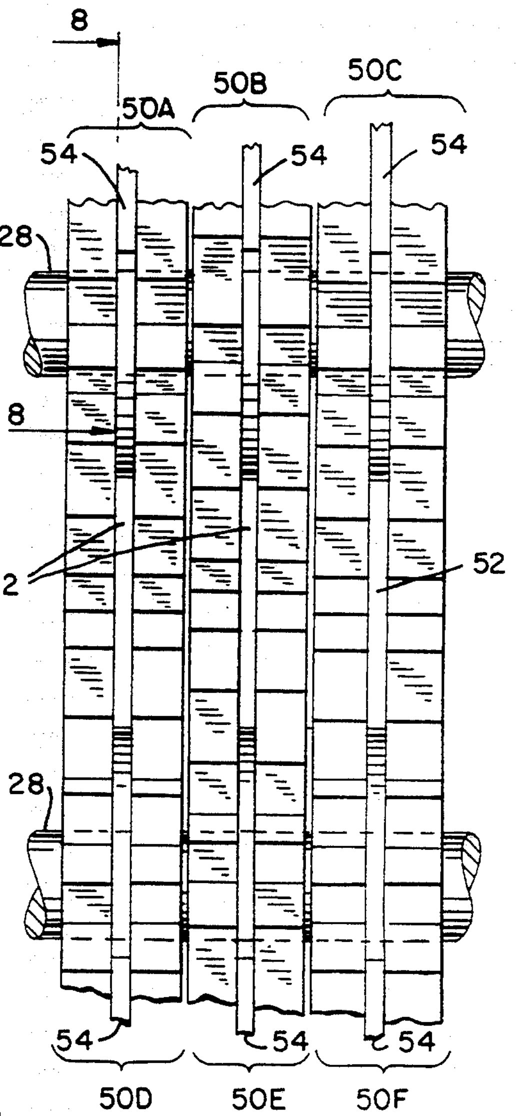
FIG. 7 is a front elevational view of the embodiment of FIG. 6.
Figure 8:
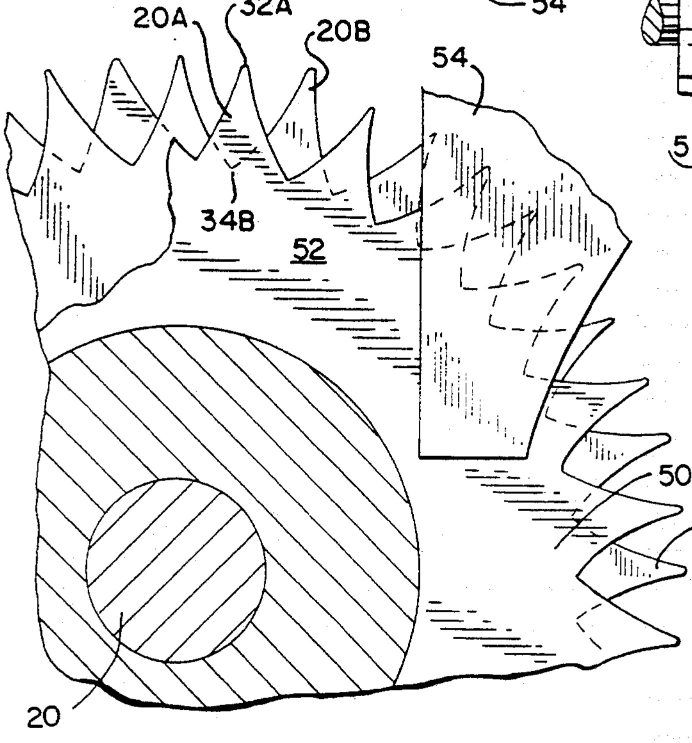
FIG. 8 is an enlarged cross-sectional view taken on line 8—8 of FIG. 7.

FIGS. 6 through 8 illustrate another embodiment of the apparatus of the present invention which can be used to produce the particle embodiment 56 shown in FIGS. 9 and 10. In this embodiment, forming mechanism 16 consists of two vertically aligned and meshing arrays of toothed wheels. Each array consists of three toothed wheels 50 (50A, B, and C in the top array and 50D, E and F in the bottom array) mounted on a shaft 28. Each toothed wheel has a central circumferential groove 52. A stripping plate 54 is suspended within each of grooves 52. These stripping plates 54 serve to eject particles from forming mechanism 16 and thereby reduce jamming and facilitate collection. The arcuate shape of stripping plates 54 preferably directs the formed particles 56 to a container.

The teeth 20 of wheels 50A, 50B and 50C comprising the upper array are staggered as are the wheels 50D, 50E and 50F of the lower array to mesh with the upper array. This is best illustrated in FIG. 8 where the peak 32A of each tooth 20A of wheel 50A is substantially aligned laterally with valley 34B of each tooth 20B of wheel 50B. The teeth of wheel 50C are laterally aligned with the teeth of wheel 50A.

The operation of the embodiment illustrated in FIGS. 6 through 8 is similar to the operation described above of the embodiment of FIGS. 1 and 4. However, meshing wheels 50B and 50E replace smooth wheels 48. Instead of forming plateaus 44 and bridges 46 as are formed by smooth wheels 48, wheels 50B and 50E give the longitudinal middle portion of particle 56 an undulating form which is out-of-phase with the two outboard longitudinal portions of particle 56. Thus, the staggered arrangement of the wheels of each array is reflected in the staggered rises and falls of particle 56, as illustrated in FIGS. 9 and 10.

FIGS. 11 and 12 show another embodiment of the apparatus of the present invention, which produces particle 58 from conventional corrugated paperboard as shown in FIGS. 13 and 14. According to that embodiment, each array of forming apparatus 16 consists of two outboard crimping wheels 60A and 60B and between them toothed wheel 62. Crimping wheels 60A and 60B are larger in diameter than toothed wheel 62. This is illustrated in FIG. 12 where the teeth of wheel 62 are outlined in dotted lines behind the teeth of outboard crimping wheel 60A. Crimping wheels 60A and 60B are thinner than toothed wheel 62. The teeth of wheels 60A, 62 and 60B are aligned rather than staggered, so that they work together to form particle 58 into its undulating shape. However, because crimping wheels 60A and 60B are larger than wheel 62, they crimp particle 58 to a narrower thickness along both of its longitudinal edges. Crimps 64 are shown in FIGS. 13 and 14. These crimps serve to maintain the shape and enhance the structural strength and resiliency of particle 58.

Figure 15:
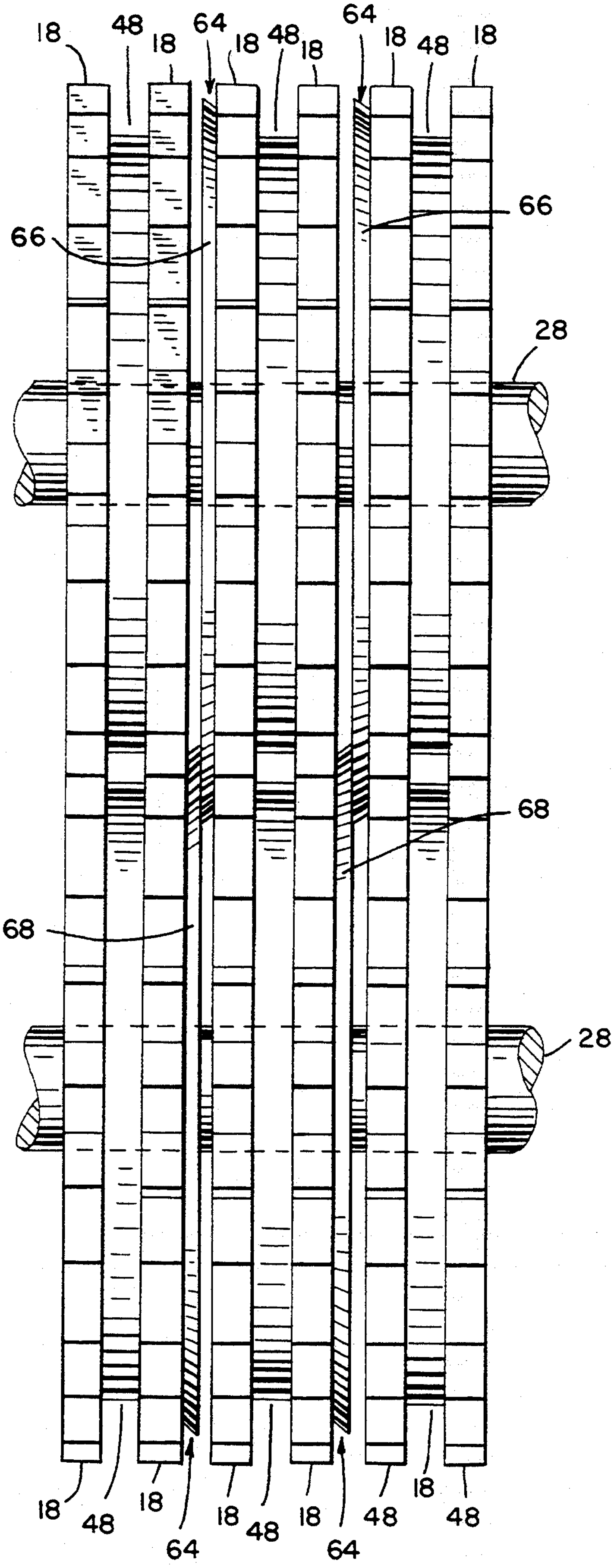
FIG. 15 is a front elevational view of a 3-wide version of the embodiment of FIGS. 1 and 2 with cutting wheels to produce three side-by-side particles like those of FIGS. 2 and 3.

FIG. 15 illustrates an embodiment in which three-wheel arrays (such as the arrays shown in FIGS. 1 and 4) are in tandem on upper shaft 28 and on lower shaft 28. Each array of wheels 18, 48 and 18 is separated by a shearing space 64. In this space, there is mounted cutting wheel 66 on upper shaft 28 and cutting wheel 68 on lower shaft 28. The sharp edges of wheels 66 and 68 overlap in the area of the meshing of the teeth of wheels 18. The overlapping sharp edges of cutting wheels 66 and 68 act as scissors to cut each segment 14 which is fed into forming apparatus 16 into three particles. In the embodiment of FIG. 15, forming apparatus 16 can accept wide segments 14 of paperboard and form them into three particles of the proper width. It will be recognized that the forming mechanism of FIG. 15 may consist of more than three tandem arrays of wheels, and the arrays may consist of the arrays of FIG. 4, FIG. 6, FIG. 11 or other arrangements.

The method of the present invention may be used to form other shapes of particles which are within the scope of the present invention.

FIG. 16 shows a three legged particle 70 which has been folded into a tent-like shape. Struts 72 are similar to plateaus 44 and bridges 46 of particle 22 as shown in FIGS. 2 and 5. These struts help maintain the shape and enhance the structural strength and resiliency of particle 70.

FIG. 17 shows a crimped particle 74 which has been formed into an approximately cylindrical or spiral shape. Crimps 64 are similar to the crimps 64 shown in FIGS. 13 and 14.

FIG. 18 shows a crimped particle 76 which has been formed into a helical shape. Crimps 64 are also similar to the crimps 64 shown in FIGS. 13 and 14.

FIGS. 19 and 20 show a strutted particle 78 which has been formed by diagonally bending a rectangular paperboard segment 14 into a right angle. Strut 80 is formed from the material of particle 78 by shearing or tearing. Strut 80 is similar in structure and function to plateaus 44 and bridges 46 of particle 22 shown in FIG. 2.

Figure 21:
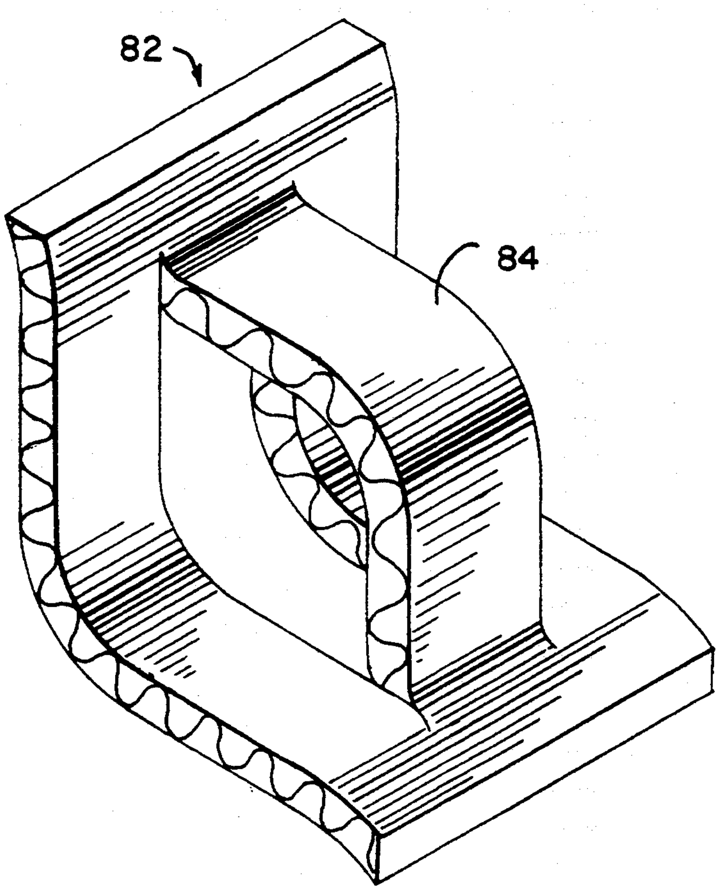
FIG. 21 is a perspective, partially schematic view of another packing particle of the present invention.
Figure 22:
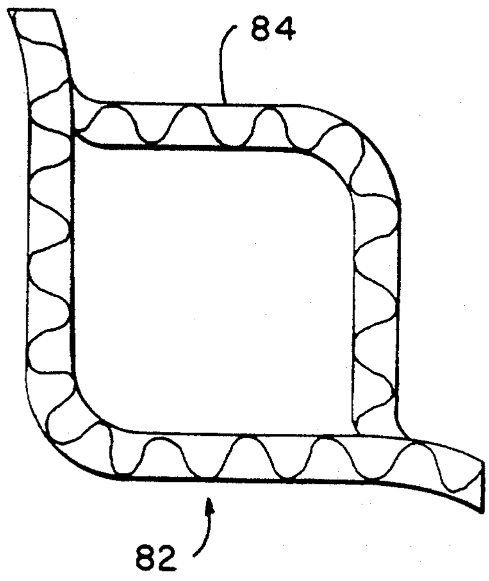
FIG. 22 is a cross-sectional view taken on line 22—22 of FIG. 21.

FIGS. 21 and 22 depict a particle 82 which is formed by making two approximately parallel longitudinal cuts or tears in a rectangular segment and bending the resulting tab 84 outward.

It has been found that the resilience and stiffness of the particles formed as described herein are greater if the paperboard segments 14 have a high moisture content at the time they are formed into particles, either as a result of the process of manufacturing fabricated paperboard or as a result of intentional moisturizing. The stiffness and resiliency is further enhanced if the formed particles are heated to accelerate their drying to a normal moisture content. For example, prior to being formed, the paperboard may be steamed, which would moisturize and warm the paperboard. After forming, the particles could be subjected to dry heat so as to dry them relatively quickly if desired.

The surface, and especially the edges, of some paperboard can be relatively abrasive, which may mar the finish or surface of some packed articles. In addition, some paperboard can generate dust in use. To minimize the problems of abrasiveness and dust, a coating may be applied to the paperboard or the formed particles. The types of coatings which may be used include poly/paraffin, polymeric and waxy polymer. Examples of such coatings are Resisto Coat TM, Nomar 70 TM and Coating 170TT TM made by Michelman, Inc. of Cincinnati, Ohio. It will be recognized that other types and brands may be used as well.

The particles of the present invention may be made from paperboard segments 14 of various dimensions. The largest segment which has been used is 3 inches by 3 inches. Preferably, particle 22 of FIGS. 2, 3 and 5 are made from segments which are approximately 2½ inches long and 1 inch wide. After the segment has been formed, the particle has a length of approximately 1¾ths inches and an effective depth of approximately ½ inch. The same size segment 14 and has been advantageously used in making particle 56 of FIGS. 9 and 10, which results in a particle having approximately the same dimensions as the particles 22 of FIGS. 2, 3 and 5. Similarly, particle 58 shown in FIGS. 13 and 14 have been preferably made from segments having a length of approximately 2¾ths inches and a width of 1 inch. After formation, particle 58 is approximately 1½ inches long and has an effective depth of approximately ½ inch. Particle 76 shown in FIG. 18 has advantageously been made from a strip 14 which is 9 inches long and 1 inch wide. After formation from such a strip, particle 76 has a tip-to-tip length of approximately 6 inches and an effective depth of approximately 1⅜ths inches. Particles 74 shown in FIG. 17 have preferably been made from a segment 14 which is 3 inches long and 1 inch wide. When formed, particle 74 has an effective depth of about 1¼th inch. Particle 70 of FIG. 16 has likewise been made from a segment 14 which is 3 inches long and 1 inch wide. When formed, particle 70 has an effective depth of approximately ⅞ths of an inch. Particle 78 shown in FIGS. 19 and 20 may be made from a segment 14 which is a square of approximately 2 inch sides. The resulting particle 78 has an effective depth of approximately 1⅜ths inches.

As a further illustration of the size, shape and packing characteristics of the particles described above, it has been found that when loosely poured into a container, particle 22 has a density of approximately 1,660 particles per cubic foot.

To use the particles produced as described herein, it is advantageous to pour a layer of particles into the bottom of the container and then to insert the object which is to be protected. Particles are then poured around and over the object. The particles have a size and shape which allow them to be poured and to flow into the spaces around a typically packed object. Moreover, the shape of the particles do not lend themselves to stacking or nesting, with the result that there are ample air gaps in the packing area, which allows resilient flexing of the particles and thereby helps to protect the object.

Although the preferred embodiments of the invention have been described above, the invention claimed is not so restricted. Other modifications and variations of these embodiments which are within the scope of the invention will be apparent to those skilled in art. For example, the toothed wheels may have different profiles from those shown herein, and there may be differing tandem arrays of toothed wheels, smooth wheels and cutting wheels. In addition to the particles shown and described herein, particles of other shapes and sizes may be within the scope of the invention. Also, corrugated particles may be formed from single face corrugated, double face corrugated (as described), triple face corrugated or corrugate of any number of face sheets. Thus, the invention is not to be limited by the specific description above, but should be judged by the claims which follow.

We claim:

1. Flowable loose packing dunnage comprising multiple particles, said particles including a particle being made of a single sheet of paperboard formed into a non-planar shape which includes an integral reinforcing structure which helps maintain the shape of the particle, said reinforcing structure including either or both of a strut or an elongated region of narrowed thickness of the paperboard.

2. Flowable loose packing dunnage as in claim 1, wherein said paperboard includes a corrugated layer.

3. Flowable loose packing dunnage as in claim 2, wherein said corrugated paperboard includes at least one uncorrugated ply and one corrugated ply laminated on one side of said uncorrugated ply.

4. Flowable loose packing dunnage as in claim 2, wherein said corrugated paperboard includes at least one corrugated ply sandwiched between and laminated to at least two uncorrugated plies, one said uncorrugated ply on each side of said corrugated ply.

5. Flowable loose packing dunnage as in claim 1, wherein said paperboard is a laminate of at least two solid plies.

6. Flowable loose packing dunnage as in claim 1, wherein said paperboard is solid and at least 0.012 inches thick.

7. Flowable loose packing dunnage as in claim 1, wherein the dimensions of each of said particles are such that each particle would fit into an orthogonal box whose length, width and depth are each less than 3 inches.

8. Flowable loose packing dunnage as in claim 1, wherein said dunnage has a density of greater than 48 particles per cubic foot after flowing into a container.

9. Flowable loose packing dunnage as in claim 1, wherein said shape is undulating.

10. Flowable loose packing dunnage as in claim 1, wherein said shape is that of a strip bent at least once to form at least two legs.

11. Flowable loose packing dunnage as in claim 1, wherein said shape is an open-ended tube having three or more approximately planar sides.

12. Flowable loose packing dunnage as in claim 1, wherein said shape is helical.

13. Flowable loose packing dunnage as in claim 1, wherein said integral reinforcing structure is a strut.

14. Flowable loose packing dunnage as in claim 13, wherein said shape is undulating.

15. Flowable loose packing dunnage as in claim 13, wherein said shape is that of a strip bent at least once to form at least two legs.

16. Flowable loose packing dunnage as in claim 13, wherein said shape is an open-ended tube having three or more substantially planar sides.

17. Flowable loose packing dunnage comprising multiple particles, said particles including a particle being made of paperboard formed into a non-planar shape, said shape including at least a pair of adjacent out-of-phase undulating strips.

18. Flowable loose packing dunnage comprising multiple particles, said particles including a particle being made of paperboard formed into an undulating shape which includes a rise and a fall, wherein a strut extends between said rise and said fall.

19. Flowable loose packing dunnage comprising multiple particles, said particles including a particle being made of paperboard formed into an undulating shape having an elongated region of narrowed thickness to enhance shape retention, strength and resiliency.

20. Flowable loose packing dunnage comprising multiple particles, said particles including a particle being made of paperboard formed into a non-planar shape, wherein said shape is that of a strip bent at least once to form at least two approximately perpendicular legs and wherein a strut extends between said at least two of said legs.

21. Flowable loose packing dunnage as in claim 20, wherein said strut is L-shaped.

22. Flowable loose packing dunnage as in claim 20, wherein said strut extends diagonally between said at least two of said legs.

23. Flowable loose packing dunnage comprising multiple particles, said particles including a particle being made of paperboard formed into a non-planar shape, wherein said shape is that of a segment bent at least once to form at least two legs and wherein the segment has an elongated region of narrowed thickness.

24. Flowable loose packing dunnage comprising multiple particles, said particles including a particle being made of paperboard formed into a non-planar shape, wherein said shape is an enclosure having three or more sides and wherein a strut extends between two of said legs.

25. Flowable loose packing dunnage as in claim 24, wherein said thickness is crimped in a portion of said particle.

26. Flowable loose packing dunnage comprising multiple particles, said particles including a particle being made of paperboard having an elongated region of narrowed thickness and being formed into a cylindrical shape such that the elongated region of narrowed thickness is circumferentially oriented relative to the cylindrical shade.

27. Flowable loose packing dunnage comprising multiple particles, said particles including a particle being made of paperboard having an elongated region of narrowed thickness and being formed into a helical shape such that the elongated region of narrowed thickness is circumferentially oriented relative to the helical shade.

* * * * *